(12) United States Patent
Ferrari et al.

(10) Patent No.: US 7,214,013 B2
(45) Date of Patent: May 8, 2007

(54) DUST EXTRACTION DEVICE FOR MACHINE TOOLS

(75) Inventors: Maurizio Ferrari, Pizzighettone (IT); Sandro Foletti, Piacenza (IT)

(73) Assignee: Jobs S.p.A., Piacenza (IT)

( * ) Notice: Subject to any disclaimer, the term of this patent is extended or adjusted under 35 U.S.C. 154(b) by 0 days.

(21) Appl. No.: 11/106,487

(22) Filed: Apr. 15, 2005

(65) Prior Publication Data

US 2005/0232717 A1 Oct. 20, 2005

(30) Foreign Application Priority Data

Apr. 16, 2004 (IT) .......................... BO2004A0218

(51) Int. Cl.
*B23C 9/00* (2006.01)

(52) U.S. Cl. .................. 409/137; 409/136; 408/241 G

(58) Field of Classification Search ................ 409/204, 409/201, 202, 209, 211, 212, 216, 234, 241, 409/144, 137, 136, 134; 408/67, 97, 81, 408/82, 58, 61, 241 G, 241 S; 173/198; 451/456; 29/DIG. 86, DIG. 78, DIG. 94; 483/13; 144/240, 371, 250.12, 251.1, 252.1

See application file for complete search history.

(56) References Cited

U.S. PATENT DOCUMENTS

| | | | |
|---|---|---|---|
| 3,837,383 A | 9/1974 | Ko | |
| 5,161,921 A * | 11/1992 | Corsi | 408/1 R |
| 5,791,842 A | 8/1998 | Sugata | |
| 5,848,859 A * | 12/1998 | Clark et al. | 408/1 R |
| 6,079,078 A | 6/2000 | Byington | |
| 6,264,590 B1* | 7/2001 | Ferrari | 483/13 |
| 6,514,018 B2* | 2/2003 | Martinez et al. | 408/14 |
| 2002/0104207 A1* | 8/2002 | Smith et al. | 29/26 A |
| 2003/0049082 A1* | 3/2003 | Morrison et al. | 408/56 |
| 2003/0077132 A1* | 4/2003 | Martinez et al. | 408/1 R |

FOREIGN PATENT DOCUMENTS

| | | |
|---|---|---|
| DE | 19541011 C1 | 4/1997 |
| DE | 19629120 A1 | 1/1998 |
| EP | 1260308 A1 | 11/2002 |
| WO | 00/76721 A1 | 12/2000 |

\* cited by examiner

*Primary Examiner*—Dana Ross
(74) *Attorney, Agent, or Firm*—Timothy J. Klima

(57) ABSTRACT

A machine tool equipped with a supporting body and at least one tool-holder spindle, rotatable about a respective axis, also has a built-in dust extraction device comprising an extractor hood located in close proximity to the spindle and presenting a suction port positionable near to a machining area, so as to extract chips and dust generated in the course of machining operations; the hood is capable of movement along a direction parallel to the axis of rotation, extended and retracted by the action of respective translating members operating in conjunction with sensors able to read the profile of a workpiece, in such a way that the suction port can be positioned to best advantage.

24 Claims, 5 Drawing Sheets

DUST EXTRACTION DEVICE FOR MACHINE TOOLS

SPECIFICATION

This application claims priority to Italian Patent Application No. BO2004A000218, filed Apr. 16, 2004, which is incorporated by reference herein.

BACKGROUND OF THE INVENTION

The present invention relates to a device for machine tools, serving to extract chips and dust generated by machining operations.

In particular, the invention relates to a dust extraction device for installation on the toolhead of a multi-axis machine tool.

The prior art embraces machine tools equipped with dust extraction devices that comprise suction ports positionable near a tool while in the process of machining. A drawback with such ports is that there are limits on how near the machining area they can be placed, given the unpredictable shapes and sizes of workpieces, the dissimilar sizes of the different tools likely to be used in succession during a machining cycle, and indeed the dimensions of the suction ports themselves, which would be incompatible with certain movements and operations performed by the machine, such as tool changes.

Clearly, a direct consequence of the above noted drawback is that machining chips and dust tend to be removed less effectively, since the force of suction diminishes significantly as the distance from the machining area increases.

The aforementioned drawback has been overcome, at least in part, with the adoption of dust extraction devices comprising a removable extractor hood built into the machine and encircling the tool clamped to the spindle.

With this arrangement, the dust generated in the course of machining can be extracted with greater effectiveness. This outcome is achieved as a result both of equipping the machine with a new automatic system by which the hood is removed before the tool change occurs and reinstated after the new tool has been fitted, and of equipping the actual hood with a set of manually installed extensions selectable according to the length of the tool in use.

Whilst the drawback in question, to reiterate, is at least partially overcome with this solution, the solution itself is not without drawbacks.

In particular, not only does the expedient of a removable extractor hood dictate the inclusion of a purpose-designed, cumbersome magazine in which to store a reserve of different size hoods selectable to suit the tool currently in use, it still does not solve problems connected with the unpredictable and/or varying geometry of the workpiece.

The object of the present invention is to remedy the drawbacks outlined above by providing a dust extraction device for machine tools that will be functional, as well as practical and effective in use.

SUMMARY OF THE INVENTION

The stated object is realized according to the present invention in a dust extraction device for machine tools equipped typically with a supporting body, and with at least one tool-holder spindle rotatable about a respective axis.

The device disclosed comprises an extractor hood located in close proximity to the spindle, presenting a suction port positionable near to a machining area, and means by which the hood is connected fluidically to an extraction shaft, the extractor hood being rendered capable of movement relative to the spindle along a predetermined direction extending parallel to the axis of rotation of the spindle.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
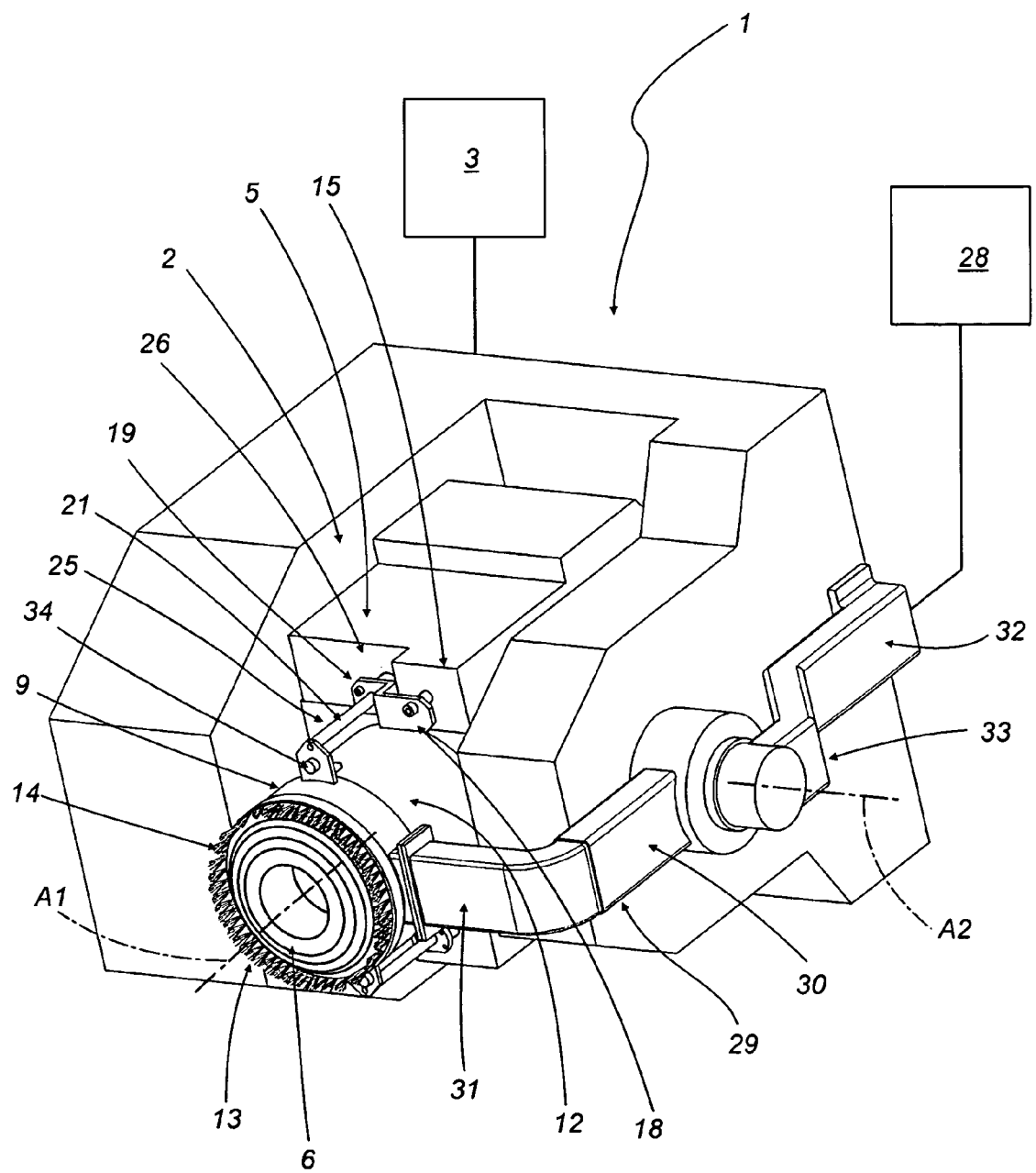
FIG. 1 illustrates a portion of a machine tool equipped with a dust extraction device according to the invention, viewed in perspective from above.
Figure 2:
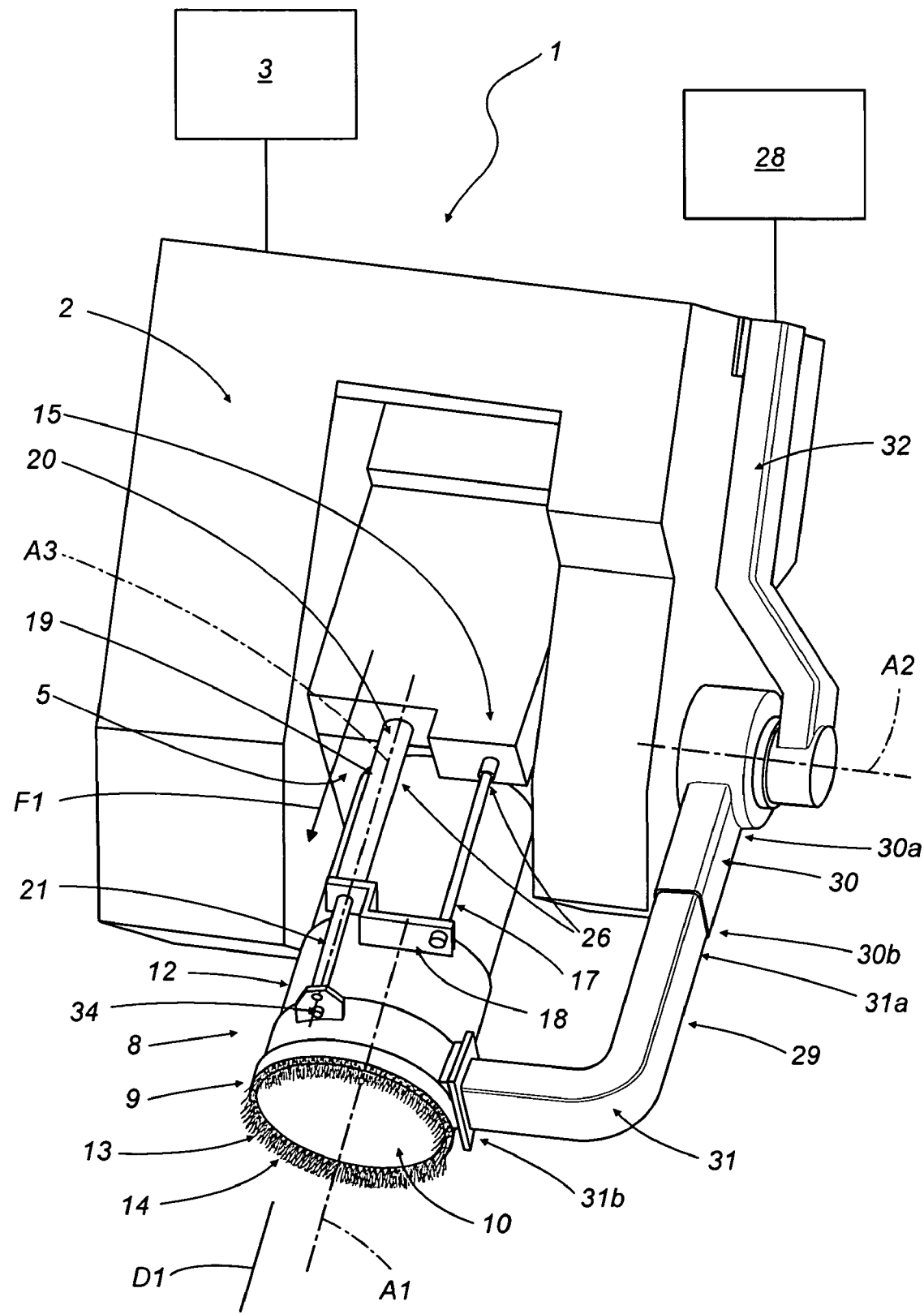
FIG. 2 shows the portion of a machine tool as in FIG. 1, viewed in perspective from above and in a different operating configuration.

Referring to FIGS. 1 and 2, numeral 1 denotes a portion of a machine tool.

The machine tool and the aforementioned portion of the machine tool are both denoted 1, without distinction, in the course of the specification.

By way of example, and implying no limitation, the machine tool 1 is a numerically controlled, multi-axis type.

The machine tool 1, conventional in embodiment and therefore described neither in general nor in detail hereinafter, typically comprises a bed (not illustrated) on which a toolhead 2 is mounted with freedom of movement, relative to the bed, along a plurality of positioning axes.

The machine 1 further comprises drive means (not illustrated), also a computerized master control unit indicated schematically as a block 3 in the drawings, such as will pilot the movement of the toolhead 2 along the aforementioned axes and govern the rotation of a tool 4 on the basis of data programmed into the selfsame control unit 3.

The toolhead 2 comprises a body, denoted 5, designed to support a tool-holder spindle 6.

The supporting body 5 is pivotable about an axis denoted A2, relative to the toolhead 2.

Figure 5:
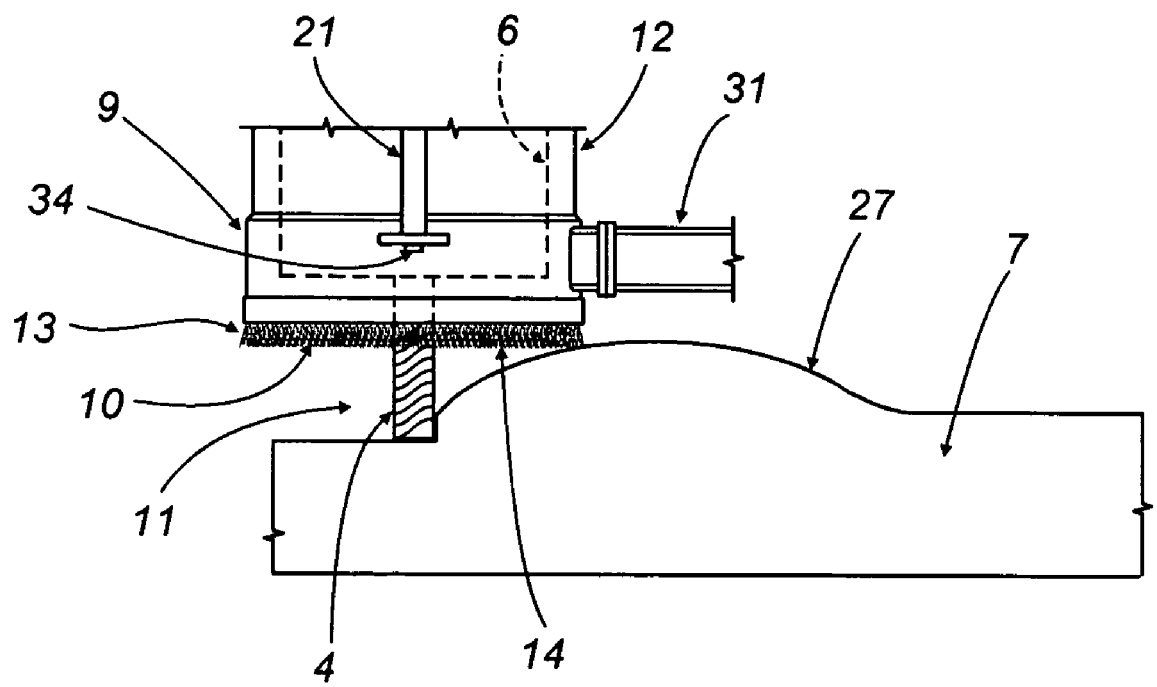
FIGS. 5 and 6 are schematic illustrations of the device according to the present invention, shown with certain parts omitted and others rendered transparent, viewed respectively in two different operating configurations.
Figure 6:
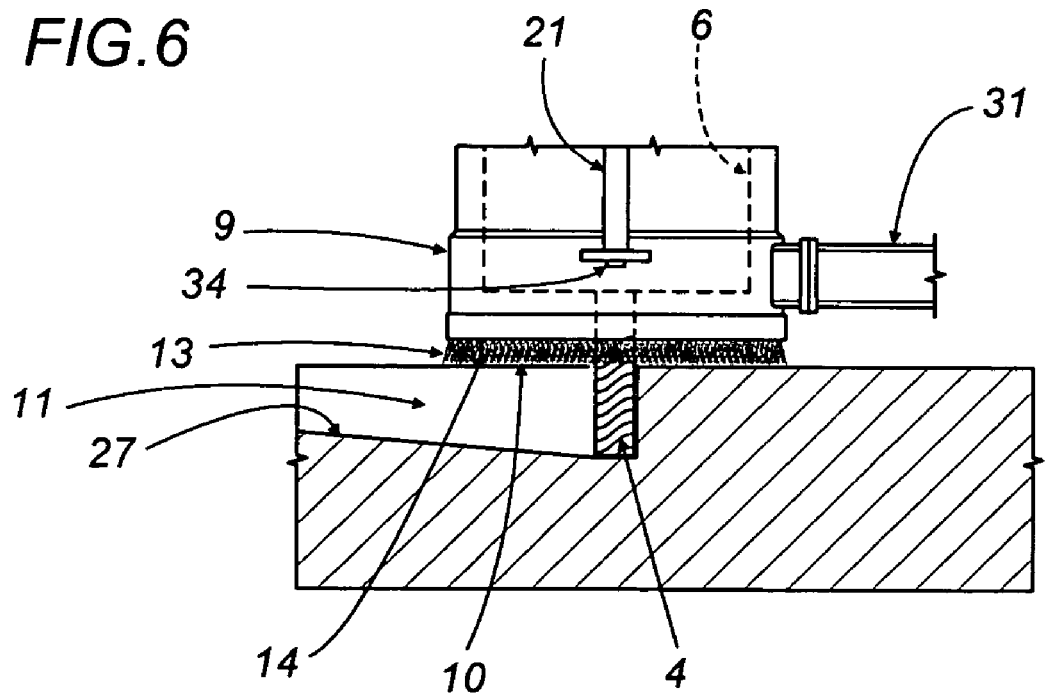

The spindle 6 rotates about a relative machining axis denoted A1 and is set in motion by suitable drive means, not illustrated, so as to rotate a tool 4 clamped to the selfsame spindle 6 as shown schematically in FIGS. 5 and 6, and carry out machining operations on a workpiece 7, as shown likewise schematically in FIGS. 5 and 6.

The machine tool 1 comprises a dust extraction device 8 serving to remove chips and particulates generated in the course of the machining steps performed by the tool on the workpiece 7.

The device 8 comprises an extractor hood 9 placed in close proximity to the spindle 6 and presenting a suction port 10 positionable in close proximity to a machining area 11, illustrated in FIGS. 5 and 6.

As discernible in FIGS. 1 and 2, the hood 9 comprises a tubular element 12 of cylindrical shape engaging slidably with a cylindrical portion 5a of the supporting body 5.

The spindle 6 is ensheathed coaxially by the cylindrical tubular element 12.

The extractor hood 9 further comprises a skirt 13 of resilient or impact resistant material located circumferentially around the peripheral rim of the suction port 10. In the example of the accompanying drawings, the skirt 13 is composed of synthetic brushes 14.

Figure 4:
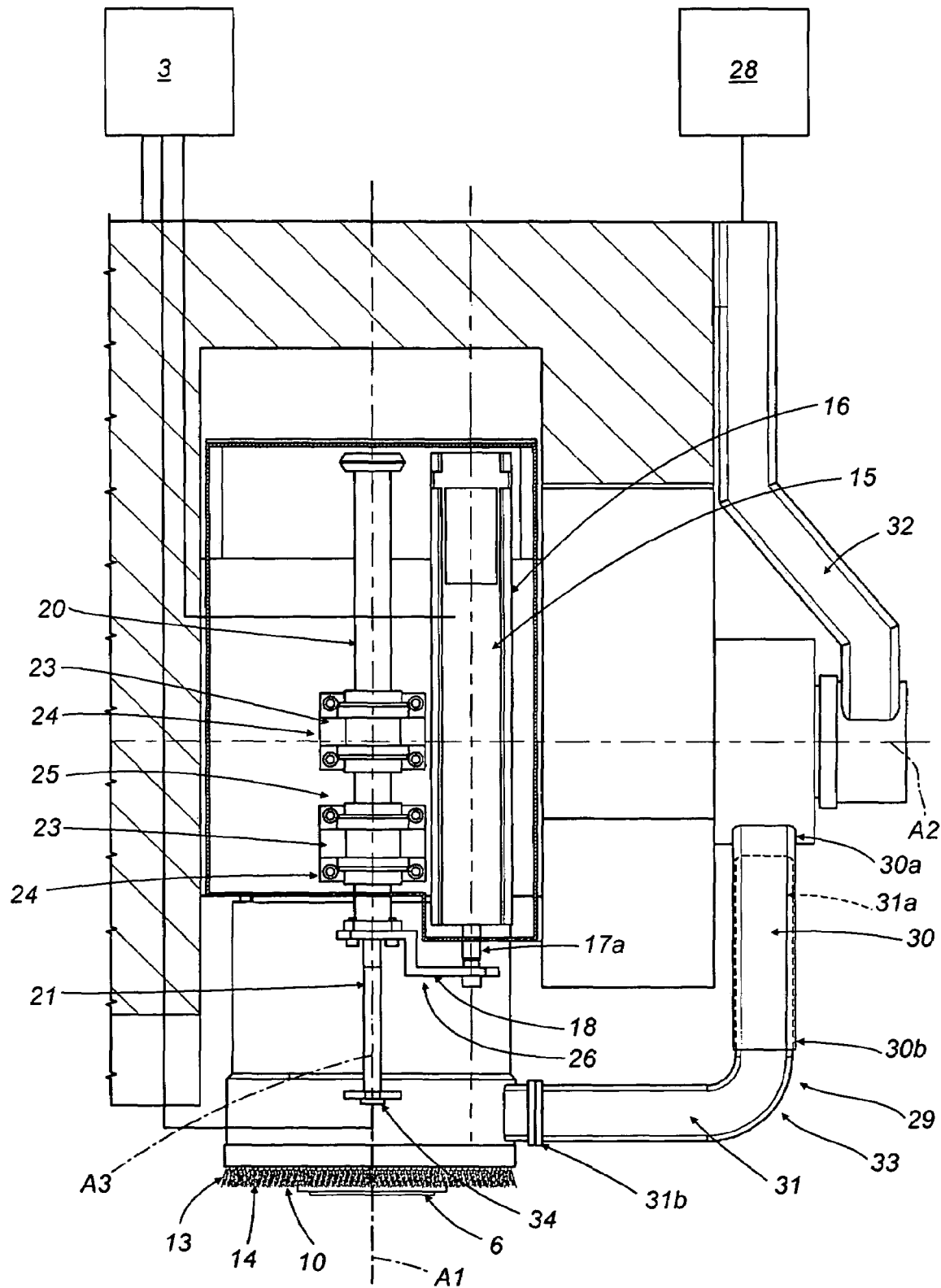
FIG. 4 is a detail of the portion of a machine tool as in FIG. 1, viewed in a front elevation, partly in section and with certain parts omitted better to reveal others.

Also mounted to the supporting body 5, as shown in FIG. 4, is a linear actuator 15 comprising a fixed part 16 connected rigidly to the body 5, and a movable part 17 extendible along a direction D1 parallel to the axis A1 of rotation of the spindle.

Fastened to one end 17a of the movable part 17, externally of the fixed part 16, is a bracket 18 coupled to a translating member 19 connected operatively to the extractor hood 9.

Figure 3:
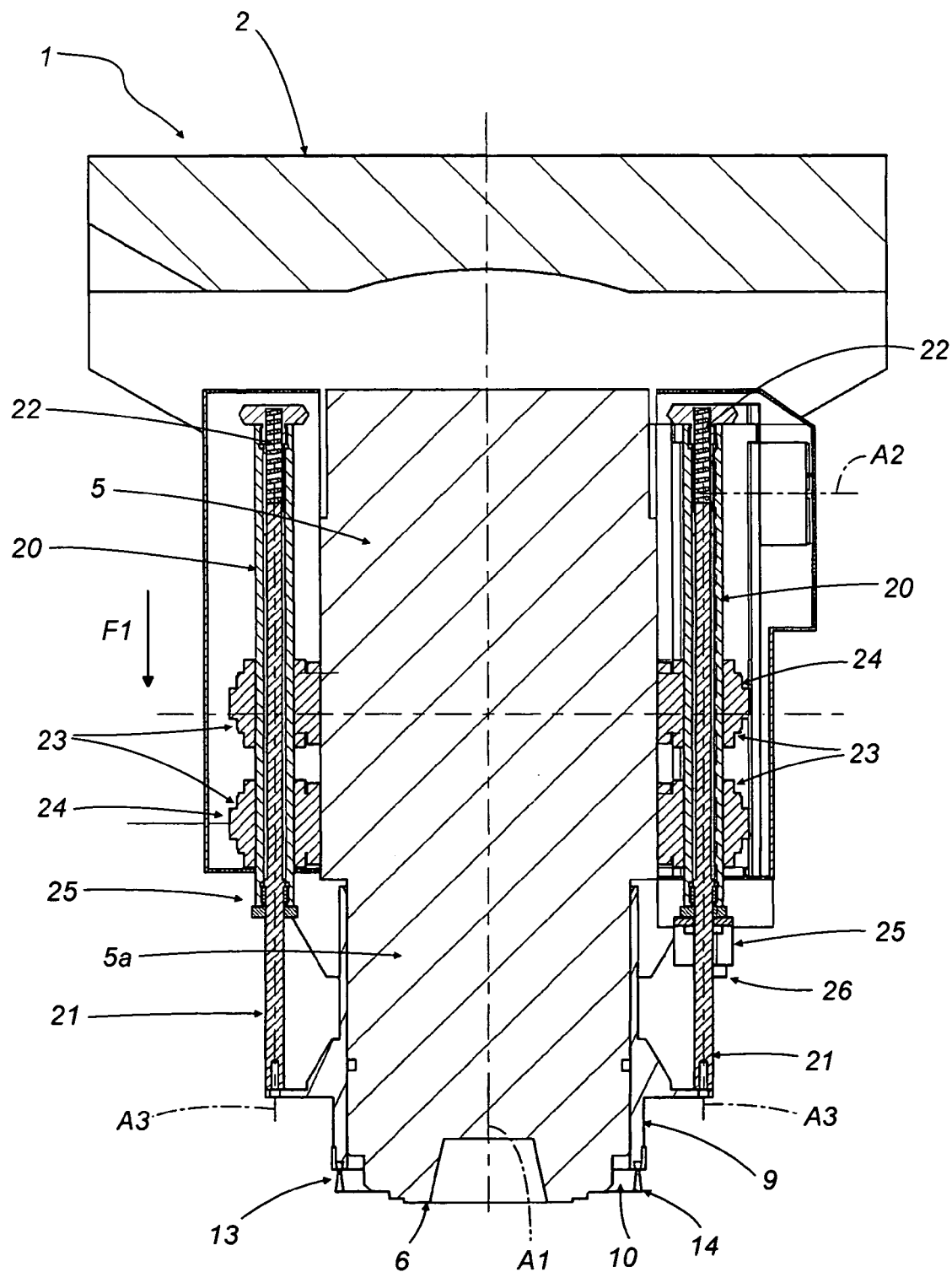
FIG. 3 is a detail of the portion of a machine tool as in FIG. 1, viewed in a side elevation, partly in section and with certain parts omitted better to reveal others.

As illustrated to advantage in FIG. 3, the translating member 19 comprises a hollow rod 20, a stem 21 slidable internally of the hollow rod 20 and connected rigidly to the cylindrical tubular element 12 of the hood 9, also a spring 22 housed internally of the hollow rod 20, interposed and operating between the rod 20 and the stem 21.

Each rod 20 and the relative stem 21 are aligned on a common longitudinal axis denoted A3.

Referring to FIGS. 3 and 4, the toolhead 2 also comprises two linear ball bearings 23 mounted to the supporting body 5, arranged in tandem along the direction of the aforementioned axis A3, with which the translating member 19, and more particularly the hollow rod 20 of the translating member 19, is slidably engaged.

The linear ball bearings 23 function as relative guide elements 24 for the translating member 19.

The translating member 19 and the aforementioned guide elements 24 combine to establish linear guide means 25 for the extractor hood 9.

The preferred embodiment of the dust extraction device 8 illustrated in the accompanying drawings comprises two translating members 19, occupying diametrically opposed positions on either side of the cylindrical tubular element 12 of the extractor hood 9; of the two members 19, only one is linked operatively to the linear actuator 15.

The linear actuator 15 combines with the linear guide means 25 to equip the device 8 with motion-inducing means 26 by which the extractor hood 9 can be directed back and forth along the aforementioned direction D1, parallel to the axis A1 of rotation of the spindle 6.

The extractor hood 9 is capable of movement along the aforementioned direction D1 at least between a first limit position, retracted as illustrated in FIG. 1, in which the spindle 6 is exposed and can be accessed for the purpose of changing the tool, and a plurality of extended positions of which one is illustrated by way of example in FIG. 2, with the spindle 6 and at least a part of the associated tool 4 (not shown in FIG. 2) enclosed laterally by the hood 9.

Thus, whenever the extractor hood 9 is retracted to the first limit position, the suction port 10 will be stationed axially in close proximity to the spindle 6, whereas with the hood 9 occupying a second extended position, the suction port 10 can be offered to the profile 27 of a workpiece 7, as illustrated clearly in FIGS. 5 and 6.

The dust extraction device 8 further comprises an air extraction shaft of familiar type, indicated schematically in FIG. 4 by a block denoted 28, which is connected fluidically with the extractor hood 9 by way of a duct 29.

The duct 29 comprises a first section 30, of which a first end 30a is associated rigidly with the supporting body 5 and pivotable thus as one with the body 5 about the aforementioned axis A2. The first section 30 also presents a second end 30b in which a first end 31a of a second section 31 is slidably insertable. The second section 31 of the duct 29 presents an elbow, and beyond the elbow, a second end 31b joined to the extractor hood 9 at a point near the suction port 10.

The duct 29 further comprises a third section, denoted 32 in FIG. 4, extending from the first end 30a of the first section 30 to connect with the extraction shaft 28.

The first and second sections 30 and 31 of the duct 29 are joined telescopically, able to extend and retract one relative to the other along the aforementioned direction D1 in response to the movement of the hood 9 and in such a way as to remain connected during the movement of the hood 9 relative to the spindle 6.

The three sections 30, 31 and 32 of the duct 29 combine to furnish the dust extraction device 8 with fluid connection means between the extractor hood 9 and the extraction shaft 28.

To advantage, as illustrated in the accompanying drawings, the device 8 comprises sensors 34 mounted to the extractor hood 9 near the suction port 10, by means of which to detect the position of the port relative to a profile 27 of a workpiece 7.

The sensors 34 are of conventional embodiment and therefore not described in detail, but will consist to advantage in proximity and/or distance sensors.

The motion-inducing means 26 of the extractor hood 9, and the aforementioned position sensors 34 if included, are interlocked to the computerized master control unit 3 of the machine tool 1.

In operation, referring to FIG. 1, with the cylindrical tubular element 12 of the hood 9 in the first position, retracted by methods and through the agency of positioning means substantially of familiar type (not illustrated), a tool is clamped to the spindle 6 either directly or by means of a suitable tool-holder, not illustrated.

The tool, denoted 4 in FIGS. 5 and 6, is now invested with motion induced in the toolhead 2 and the supporting body 5 by the master control unit 3, and assumes a position of close proximity to a predetermined machining area 11 occupied by the workpiece 7.

In accordance with a first operating method of the dust extraction device 8 disclosed, when a given tool 4 is fitted to the spindle 6, the master control unit 3 will detect the axial dimension of the tool 4 in question, that is to say its length as measured along the axis A1 of rotation of the spindle, and thereupon activate the motion-inducing means 26 so as to shift the cylindrical tubular element 12 and bring the suction port 10 into a predetermined and preset optimum position.

Other parameters may be evaluated by the master control unit 3, in addition to the axial dimension of the tool 4, to the end of selecting the most advantageous position for the extractor hood 9; the parameters in question might be, for example, type of tool, spindle speed, material in process, etc.

More exactly, according to the parameter or the parameters detected, the linear actuator 15 will be activated by the master control unit 3, and the movable part 17 caused to extend along the relative direction D1 of movement, projecting a set distance from the fixed part 16; the linear motion of the movable part 17 is thus transmitted by way of the bracket 18 to the hollow rod 20 of the translating member 19.

The hollow rod 20 slides within the linear ball bearings 23, drawing the stem 21 in the direction of the arrow denoted F1 (FIGS. 2 and 3) through the action of the interposed spring 22.

Since the stem 21 is coupled operatively to a projecting portion of the cylindrical tubular element 12, this too is drawn in the direction of the arrow F1, thereby causing the extractor hood 9 to extend and to assume one of the aforementioned second positions.

In accordance with a further operating method of the dust extraction device 8 disclosed, the motion of the hood 9 along the predetermined direction D1 is piloted by the master control unit 3 using input data derived from the profile 27 of a workpiece 7.

The profile 27 of the workpiece 7 can be detected instantaneously by the master control unit 3 via the aforementioned sensors 34, or alternatively, a map of the profile 27 can be generated beforehand and programmed into the control unit 3 employing conventional machine tool setup procedures.

In the first method, involving the active use of sensors 34, the function of these same sensors, once the extractor hood 9 has been moved close to the workpiece 7, is to monitor the position of the selfsame hood 9 relative to the profile 27 of the workpiece 7 substantially in continuous mode and supply a corresponding input to the master control unit 3. The master control unit 3 will respond by adjusting the position of the hood 9 so as to avoid any contact with the workpiece 7, while maintaining the suction port 10 advantageously close to the workpiece 7 and thus optimizing the effectiveness of the chip and dust extracting action.

In the second method, which involves programming the profile 27 and the relative machining cycle into the master control unit 3, the adjustment in position of the extractor hood 9 along the axis A1 of rotation of the spindle 6 is accomplished by the unit 3 without sensing the relative positions of the hood 9 and the workpiece 7; in effect, only the relative positioning of the hood 9 and spindle 6 is monitored, advantageously by sensing the position of the actuator 15 electronically.

In the case of the second method, numeral 27 denotes the profile both of the blank workpiece 7 and of the machined workpiece 7; in other words, the position of the extractor hood 9 relative to the spindle 6 will be adjusted both in response to changes in shape of the blank workpiece 7 (as in FIG. 5, for example), and in response to changes in the path followed by the tool 4 (as in FIG. 6, for example).

To advantage, the sensors 34 can also be utilized in the context of the second method described above to perform control and safety functions, that is, without actively influencing the movement of the hood 9 but ensuring accidental contact between the extractor hood 9 and the workpiece 7 is avoided, for example, in the event that the master control unit 3 should detect an error in programming of the profile 27.

According to the invention, the machine 1 might be fitted with any type of tool. In particular, albeit implying no limitation, the invention will find application preferably with tools 4 employed for milling, drilling, boring, spot-facing, thread-tapping, contouring and countersinking operations.

To advantage, the provision of a skirt 13 made from resilient material around the suction port 10 of the extractor hood 9, and in this particular instance a skirt of synthetic brushes 14, ensures that in the event of accidental contact between the hood 9 and the workpiece 7, neither the hood 9 nor the workpiece 7 will suffer damage of any kind.

With this in mind, importance also attaches to the inclusion of the springs 22 which, likewise in the event of accidental contact between hood 9 and workpiece 7, are designed to cushion the movement of the translating members 19 by which motion is induced in the selfsame hood. In short, with the springs 22 operating between the hollow rod 20 and the stem 21, any impact that could be generated by the aforementioned accidental contact will not be transmitted rigidly to the actuator 15 or to other parts of the machine 1.

Advantageously, the springs 22 afford a further useful function exploitable during the course of drilling operations. In this instance, by creating tension through the sliding stems 21 to force the extractor hood 9 into contact with the surface of the workpiece 7, the springs 22 ensure that a minimal distance can be maintained between the suction port 10 and the machining area 27, even during the feed motion of the spindle 6 along its axis of rotation A1.

In accordance with other embodiments of the dust extraction device 8 according to the invention, not illustrated, the extractor hood 9 comprises two or more cylindrical tubular elements mounted together telescopically and thus extendible and retractable reciprocally along the aforementioned direction D1 parallel to the axis of rotation of the roller.

In other variations of the present invention, likewise not illustrated, the tubular element or elements of the extractor hood 9 might be of any given shape, and not necessarily cylindrical.

To further advantage, the linear actuator 15 comprises an electric motor of brushless type.

What is claimed is:

1. A dust extraction device for machine tools, comprising:
a supporting body;
at least one tool-holder spindle rotatable about a respective axis;
an extractor hood located in close proximity to the spindle, presenting a suction port positionable near to a machining area, and rendered telescopically movable relative to the spindle along a predetermined direction extending parallel to the axis of rotation of the selfsame spindle;
means for fluidically connecting the hood with an extraction shaft, the fluidically connection means comprising a duct joined to the extractor hood and presenting at least two sections coupled telescopically one to another and thus extendible and retractable to accommodate the movement of the extractor hood along the predetermined direction, each section being a respective tubular element.

2. A device as in claim 1, wherein the extractor hood is capable of movement at least between a retracted first limit position, in which the spindle is exposed and accessible for tool change purposes, and an extended second position in which the spindle and at least a part of the tool fitted to the spindle are enclosed laterally by the hood.

3. A device as in claim 1, comprising motion-inducing means by which the extractor hood is moved along the predetermined direction.

4. A device as in claim 1, wherein the motion-inducing means comprise at least one linear actuator presenting a fixed part rigidly associated with the supporting body, and an extendible part connected operatively to the extractor hood.

5. A device as in claim 3, wherein the motion-inducing means comprise linear guide means associated with the extractor hood, presenting at least one guide element rigidly associated with the supporting body, and at least one translating member connected operatively to the hood and coupled slidably to the guide element.

6. A device as in claim 5, wherein the guide element is a linear ball bearing.

7. A device as in claim 5, wherein the translating member comprises a hollow rod slidably engaging the guide element, also a stem slidable internally of the hollow rod and connected rigidly to the extractor hood, and spring means interposed operatively between the rod and the stem.

8. A device as in claim 1, wherein the extractor hood comprises a tubular element slidably ensheathing a portion of the supporting body.

9. A device as in claim 8, wherein the tubular element is cylindrical in shape and slidably engages a cylindrical portion of the supporting body.

10. A device as in claim 9, wherein the cylindrical tubular element is disposed coaxially with the spindle.

11. A device as in claim 1, wherein the extractor hood is equipped around the peripheral rim of the suction port with a skirt fashioned from resilient or impact resistant material.

12. A device as in claim 11, wherein the skirt is fashioned with synthetic brushes.

13. A device as in claim 1, comprising means, located near the suction port, by which to sense the position of the selfsame port relative to a profile of a workpiece.

14. A device as in claim 13, wherein the sensing means comprise a proximity sensor.

15. A device as in claim 13, wherein the sensing means comprise a distance sensor.

16. A device as in claim 1, in a machine tool and comprising a computerized master control unit, wherein the motion-inducing means are interlocked to the master control unit, which activates the positioning movement of the hood along the predetermined direction according to the axial length of a tool fitted to the spindle.

17. A device as in claim 13, in a machine tool and comprising a computerized master control unit, wherein the motion-inducing means are inter-locked to the master control unit, which activates the positioning movement of the hood along the predetermined direction according to the profile of a workpiece.

18. A device as in claim 17, wherein the profile of the workpiece is identified instantaneously by the sensing means.

19. A device as in claim 17, wherein the profile of the workpiece is programmable internally of the computerized master control unit.

20. A machine tool, comprising a dust extraction device as in claim 1.

21. A device as in claim 1, wherein the extractor hood comprises at least two tubular elements coupled telescopically one to another, of which at least one is capable of movement along the predetermined direction.

22. A device as in claim 1, wherein the extraction hood is disposed around the spindle.

23. A dust extraction device for machine tools, comprising:

a supporting body:

at least one tool-holder spindle rotatable about a respective axis;

an extractor hood located in close proximity to the spindle, presenting a suction port positionable near to a machining area, and rendered telescopically movable relative to the spindle along a predetermined direction extending parallel to the axis of rotation of the selfsame spindle, the extractor hood is equipped around the peripheral rim of the suction port with a skirt fashioned from resilient or impact resistant material;

means for fluidically connecting the hood with an extraction shaft, the fluid connection means comprising a duct joined to the extractor hood and presenting at least two sections coupled telescopically one to another and thus extendible and retractable to accommodate the movement of the extractor hood along the predetermined direction, each section being a respective tubular element.

24. A dust extraction device for machine tools, comprising:

a supporting body;

at least one tool-holder spindle rotatable about a respective axis;

an extractor hood located in close proximity to the spindle, presenting a suction port positionable near to a machining area, and rendered telescopically movable relative to the spindle along a predetermined direction extending parallel to the axis of rotation of the selfasme spindle, the extractor hood is equipped around the peripheral rim of the suction port with a skirt fashioned with synthetic brushes;

means for fluidically connecting the hood with an extraction shaft, the fluid connection means comprising a duct joined to the extractor hood and presenting at least two sections coupled telescopically one to another and thus extendible and retractable to accommodate the movement of the extractor hood along the predetermined direction, each section being a respective tubular element.

* * * * *